United States Patent [19]
Tejeda

[11] 3,869,376
[45] Mar. 4, 1975

[54] SYSTEM FOR DEMINERALIZING WATER BY ELECTRODIALYSIS

[76] Inventor: Alvaro R. Tejeda, New York, N.Y.
[22] Filed: May 14, 1973
[21] Appl. No.: 359,702

[52] U.S. Cl.............................. 204/301, 204/180 P
[51] Int. Cl............................................. B01k 5/00
[58] Field of Search ........................ 204/180 P, 301

[56] References Cited
UNITED STATES PATENTS
3,084,113  4/1963  Vallino .................... 204/180 P X
3,645,884  2/1972  Gilliland .................. 204/180 P X Primary Examiner—John H. Mack
Assistant Examiner—A. C. Prescott
Attorney, Agent, or Firm—Kirschstein, Kirschstein, Ottinger & Frank

[57] ABSTRACT

This disclosure relates to the electrodialytic demineralization of water by passing soft water through a treating chamber defined by a pair of permselective membranes of which the one closer to the cathode of the cell is cationic permselective and the one closer to the anode is anionic permselective. The chamber is charged with an ion exchange material. The effluent from the treating chamber may be passed through a second like treating chamber. The ion exchange materials with which the cell or cells are charged may be cationic, anionic, both cationic and anionic, or cationic in one chamber and anionic in another chamber where more than one treating chamber is employed. The particular types of ion exchange materials selected will depend upon the flow pattern and arrangement of chambers in different electrodialytic cells embodying the invention.

4 Claims, 7 Drawing Figures

AM = ANION EXCHANGE MATERIAL

DIW = DEIONIZED WATER

SYSTEM FOR DEMINERALIZING WATER BY ELECTRODIALYSIS

CROSS-REFERENCE TO RELATED APPLICATION

The present application is related to co-pending application Ser. No. 321,333 filed Jan. 5, 1973, for "SYSTEM FOR INHIBITING ATTACK ON A FERROUS ANODE ELECTRODE IN AN ELECTRODIALYTIC CELL".

BACKGROUND OF THE INVENTION

1. Field of the Invention

An electrodialytic cells having treating chambers constructed, charged and connected to demineralize water.

2. Description of the Prior Art

Water, as obtained from natural sources, frequently contains substantial concentrations of dissolved salts. For example, rain water, which falls from the clouds through the atmosphere before reaching the earth, usually will dissolve traces of acidic gases from the air such, for example, as carbon dioxide, sulfur dioxide, nitrous oxides, etc., thus forming mineral acids. As the acidic water seeps through the ground it will dissolve the various components of the soil which are either water soluble, per se, or become soluble by virtue of chemical action with the mineral acids in the water. Water percolating through the ground also dissolves various salts present therein. Hence, ground waters such, for instance, as wells and springs, and surface waters such, for instance, as rivers, lakes and oceans, contain more or less dissolved matter most of which are electrolytes in solution and, therefore, ionized. The charge on any given single ion may be positive or negative depending upon whether it is a cation or anion. Thus, metallic cations and hydrogens cations usually are positively charged, whereas the anions such as bicarbonates, carbonates, sulfates, nitrates and chlorides are negatively charged, the charges for the ions of any given salt in solution being balanced. The cations which most commonly occur in natural water, be it ground or surface, are sodium ($Na^+$), calcium ($Ca^{++}$) and magnesium ($Mg^{++}$). Other cations which frequently are present include potassium, iron and manganese. There also are traces of cations such, for instance, as lithium, rubidium and ammonium. The most commonly occurring anions in ground and surface waters are those which produce alkalinity such, for instance, as bicarbonates ($HCO_3^-$) and carbonates ($CO_3^{+}{}_{115}$), as well as anions which produce acidity such as chlorides ($Cl^-$) and sulfates ($SO_4^{+}{}_{115}$) in addition to lesser amounts of nitrates, fluorides and phosphates.

The presence of cations and anions is objectionable for many purposes and in many systems that utilize water. Therefore, it frequently is desirable to subject natural water (ground and surface water) to a demineralizing treatment prior to use. For example, it is desirable to remove substantially all of the dissolved ionic impurities from the water used in very high pressure boilers, in the production of electronic components, in delicate plating operations, in the production of pharmaceuticals, and in many other applications.

One way in which the prior art approached the problem of demineralizing water so as to obtain ion-free water was by distillation. This is an expensive process.

Another way adopted by the art was the use of ion exchange equipment. Demineralized waters obtained by the latter process are comparable or superior in quality to distilled water for many purposes. The ion exchange process depends upon two reaction stages. In the first, all metal ions are removed and replaced by hydrogen ions using a cation exchange resin which is regenerated with an acid. In the second stage, acids produced in the first stage are removed with the aid of an anion exchange resin which is regenerated with an alkali such as sodium hydroxide. The well-known equations set forth below illustrate these reactions:

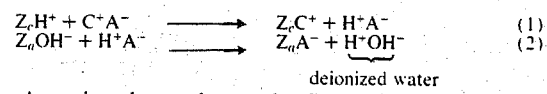

$$Z_cH^+ + C^+A^- \longrightarrow Z_cC^+ + H^+A^- \quad (1)$$
$$Z_aOH^- + H^+A^- \longrightarrow Z_aA^- + \underbrace{H^+OH^-}_{\text{deionized water}} \quad (2)$$

As pointed out above, the first stage (1) involves the replacement of all cations ($C^+$) in raw water by hydrogen ions ($H^+$), thus obtaining the free acids ($H^+A^-$) corresponding to the various acid radicals ($A^-$) which have been formed by ionization of the sundry salts ($C^+A^-$) dissolved in the raw water. The materials ($z_c$) employed in this first stage are strongly acidic, a typical such material being a sulfonic type cation exchange resin.

The second stage (2) involves the use of a strong base anion resin ($Z_a$) which replaces all of the anions ($A^-$) in the acids obtained in the first stage with hydroxide ions ($OH^-$) forming deionized water.

Another and very effective ion exchange process for producing demineralized water is the so-called "mixed bed" process. It has been found that an almost completely demineralized water can be obtained by passing raw water through a single bed containing an intimate mixture of a strongly acidic cation exchange material and a strongly basic anion exchange material. In this case the individual particles of the cation exchange material and the anion exchange material, in effect, alternate and essentially act as an infinite series of the aforesaid two stage demineralizers. Such a process is particularly useful for producing ultra-pure demineralized water for use in rinsing of transistors and other electronic components and for critical pressure boilers. Although two ion exchange materials are intimately interspersed with one another in a mixed bed, they, too, can be regenerated after exhaustion, a typical method being by hydraulic separation since their densities are slightly different. The thus-separated ion exchange materials are regenerated separately, the cationic with an acid and the anionic with an alkali. Thereafter, after rinsing, they are re-mixed for further use.

The disadvantage with the distillation process is, as indicated above, that it is an expensive one and, moreover, trace impurities are picked up in the distillation process.

As to the ion exchange procedures, a disadvantage is that the beds thereof become exhausted after a period of use which is far from indefinite and must, therefore, be taken out of service and regenerated. Where substantial quantities of raw water are to be demineralized the regeneration must be practiced at frequent intervals. The ion exchange materials are, themselves, expensive and must be used in substantial quantities to extend their useful lives before the necessity for regeneration. Moreover, the regeneration involves the use of chemicals such as sulfuric acid, hydrochloric acid and sodium hydroxide which likewise entail cost and, moreover, the regeneration steps are inconvenient and require additional equipment. Furthermore, the demineralizing equipment for the raw water is unavailable during the period of regeneration so that storage tanks for demineralized water or duplicate stand-by equipment must be provided in systems wherein a constant supply of demineralized water is desired. Thus, in the ion exchange processes a batch or discontinuous treatment must be employed. Still further, conventional ion exchange processes are not particularly effective and in many cases are not economic when the raw water to be treated contains more than 1000 ppm of total dissolved solids.

It is also theoretically possible to demineralize raw water by electrodialysis with permselective membranes of opposite types defining opposite sides of a treatment chamber with the cation permselective membrane closer to the cathode and the anion permselective membrane closer to the anode and with the treatment chamber devoid of an ion exchange material. The difficulty with this arrangement, however, is that it is commercially unfeasible for use on raw water containing less than 500 ppm because the conductivity of the treatment chamber becomes abnormally high due to the low level of mineral content. Hence, the treated water contains a very substantial weight of dissolved solids. Furthermore, in this method there is precipitation of insoluble salts on the cathode chamber and on the anodic side of the anion permselective membrane. As a practical matter this type of treatment requires an initially high ionic concentration, for example, over about 1000 ppm, and the ionic concentration of the effluent treated water, although reduced, still is relatively high, being, for practical purposes, about 500 ppm, which is acceptable for drinking and serves some industrial purposes but is not considered a "deionized" water for the special purposes to which the latter is put.

Finally, it has been proposed to demineralize raw water by electrodialysis with permselective membranes in conjunction with ion exchange materials of both types, to wit, cationic and anionic. Such a system is disclosed in U.S. Pat. No. 2,923,674. In this system the ion exchange material serves to reduce the resistance to flow of electric current through the treating chamber despite the fact that the water passing therethrough may have a very low ionic concentration, and permits the effluent to have an ionic concentration below 5 ppm at a reasonably low power input level.

Nevertheless, it is well known that the operation of an electrodialytic cell such as just described presents a number of problems in the production of deionized (demineralized) water, particularly when the influent contains a high concentration of calcium and magnesium salts, the presence of which salts characterizes "hard" water. Exemplificative of such problems are:

1. Precipitation of insoluble materials, principally calcium and magnesium compounds, in the cathode chamber adjacent the cathodic side of the cationic permselective membrane and adjacent the cathode plate. In the cathode chamber alkaline media are produced by electrolysis which increases such precipitations. Indeed, such precipitations are so bad that the process must be stopped after a short period of operation of such an electrodialytic cell.

2. Precipitation of insoluble materials, principally calcium and magnesium compounds at the anodic side of the anion permselective membrane. At said anodic side an alkaline condition exists immediately adjacent the anodic side of the anion permselective membrane due to the transfer of some hydroxyl ions from the treating chamber into the adjacent waste chamber which is in part defined by said anion permselective membrane. Said alkaline condition promotes the precipitation just mentioned.

3. At the cathodic sides of cation permselective membranes where more than one treating chamber is present in the cell, which treating chambers are not the treating chamber adjacent the cathode chamber, the precipitation situation is not as bad as mentioned in (1) above because acid media exist immediately adjacent these cation permselective membrane surfaces due to the transfer of some hydrogen ions from such treating chambers into the adjacent waste chambers alongside the treating chambers on the cathodic side thereof. Said acid condition will, under certain circumstances, avoid the precipitation of insoluble compounds at these zones. However, if the raw water contains a large amount of certain anions, e.g. sulfate anions, precipitation of an insoluble sulfate salt, e.g. calcium sulfate, may occur at these sites.

4. At the anode chamber an acid condition is produced due to electrolysis so that nascent oxygen is generated at the anode plate. This oxygen and the acid condition existing will corrode almost any material used for the anode and, except for the use of special material such as platinized tantalum, platinized titanium or other expensive noble metals which are inert to nascent oxygen, or the use of a system such as is shown, described and claimed in my co-pending application Ser. No. 321,333 filed Jan. 5, 1973 for "SYSTEM FOR INHIBITING ATTACK ON A FERROUS ANODE ELECTRODE IN AN ELECTRODIALYTIC CELL," is the cause of considerable difficulty.

5. The necessity of maintaining circulation in a predetermined inflexible pattern through ion-exchange material chambers, first the cation exchange material and subsequently the anion exchange material, presumably in an effort to prevent an intolerable degree of precipitation.

6. The amount of hydrogen and hydroxyl ions transferred from the treating chamber or chambers across the premselective membranes to the adjacent waste chambers may not be equal and, as a result, there may be an undesirable pH shift on the effluent deionized water. It is possible to control the pH of such effluent by varying the relative proportions of cation to anion materials and the strength thereof which is charged into the treating chambers, but the pH of the effluent cannot be controlled externally of the electrodialytic cell. If a mixed bed of ion exchange material is employed and is almost pure cationic exchange material, a large amount of hydroxyl ions is transferred through the anion permselective membrane or membranes so that there is a deficiency of hydroxyl ions with a consequent depression in the pH of the deionized water. On the other hand, if the mixed bed is sufficiently pure anion exchange material, a large number of hydrogen ions is transferred through the cation permselective membrane or membranes of the treating chamber or chambers, thereby producing effluent deionized water having an alkaline pH. By suitably adjusting the proportion of the cation exchange material to the anion exchange material the pH can be set where desired for a specific constitution of raw water and for specifically charged treating chambers. For example, a mixture of about 30% by volume of a strong acid cation exchange resin and 70% by volume of strong base anion exchange resin produces deionized effluent water with a pH in the range of 5.5 to 6.6 starting with raw water. Generally speaking, the pH of said effluent deionized water depends upon the composition of the raw water, the ratio of the cation to anion exchange material charged into the treating chamber and the types and strengths of the cation and anion exchange materials used. To exemplify, if the mixed bed includes about 50% by volume of a weak acid cation exchange resin and 50% by volume of a strong base anion exchange resin, the effluent deionized water, starting with raw water, would have a pH in the range of 6.0 to 7.0. However, the pH cannot be consistently maintained within acceptable limits over substantial periods of time due to variations in the constitution of the raw water and to deterioration of the charges in the treating chambers.

SUMMARY OF THE INVENTION

1. Purposes of the Invention

It is a principal object of the present invention to provide an electrodialytic system for demineralizing water which avoids the foregoing drawbacks.

It is another object of the invention to provide an electrodialytic system which, in addition to overcoming the above problems and limitations relating to distillation, ion exchange and electrodialytic processes, provides procedures and equipment for deionizing electrolytic solutions which are adapted to treat solutions of very low ionic concentrations in advantageously economical and convenient manner with low power requirements and high efficiency of energy utilization, as well as effecting demineralization of water to very low ionic concentrations more economically than heretofore has been possible.

It is another object of the invention to provide a continuous electrodialytic deionization process which does not require shut-downs for regeneration procedures or acid or caustic for such procedures.

It is another object of the present invention to provide an electrodialytic demineralizing process through the use of which liquids having ionic concentrations of even greater than 1000 ppm of total dissolved solids can be processed quickly, easily and economically to produce deionized liquids having ionic concentrations as low as .5 ppm and less of total dissolved solids.

It is another object of the invention to provide an electrodialytic demineralizing process in which precipitation of insoluble materials within the treating chamber or chambers and within waste chambers is substantially eliminated.

It is another object of the invention to provide an electrodialytic demineralizing process in which, if desired, ferrous material such as ordinary iron or steel can be employed for the cathode and anode electrodes, and particularly the anode electrode, without the necessity of using electrically conductive rare and expensive materials, which are highly inert to the corrosive conditions prevailing.

It is another object of the invention to provide an electrodialytic demineralizing process in which the pH of the effluent deionized water easily can be controlled from a point outside the cell so that it is particularly simple to maintain any desired pH over an extended period of time.

Other objects of the invention in part will be obvious and in part will be pointed out hereinafter.

2. Brief Description of the Invention

The present invention achieves the foregoing objects and others which will be apparent as the description proceeds, by feeding previously softened water to a treating chamber of a special type or to treating chambers in series or in parallel or in series-parallel. In other words, the water to be demineralized is subjected to a softening step by passage through a softening apparatus before undergoing any demineralizing procedure. The softening process used can be that of any conventional system available. As is well known, in a softening process metallic cations, at least some of the salts of which are sparingly soluble, are replaced by cations the salts of which are highly soluble. The usual cation used for replacement is sodium and, indeed, the present process is practiced most readily by substituting such a cation for essentially all of the other cations in the raw water whereby raw water never enters the demineralizing electrodialytic apparatus. The treating chamber which is employed is one which is interposed between two waste chambers. The treating chamber is defined by opposed walls of permselective membranes and the chamber forms part of a cell with a cathode electrode at one end and an anode electrode at the other. The permselective membrane of the treating chamber which is closer to the cathode is a cation permselective membrane and the permselective membrane closer to the anode is an anion permselective membrane. In a preferred form of the invention, the permselective membranes are flat and parallel. The treating chamber or chambers are filled with an ion exchange material which may be cation exchange material or anion exchange material or both such materials. Such ion exchange materials can be in the form of bead-like ion exchange resins, ion exchange foams, ion exchange fabrics, woven ion exchange filaments, etc. Where treating chambers are hydraulically connected in parallel one preferably is filled with cation exchange material and the other with anion exchange material, the order of series flow being inconsequential. The use of two such materials is serially connected chambers or in a chamber containing both such materials tends to maintain the pH of the effluent deionized water close to neutrality except where solutes having certain anions, such as chlorides and sulfates, are present in the soft water. The cell may include a chamber for converting raw water into soft water, or the softening may be practiced externally to the cell. The cell also may include cathode and anode electrode chambers which are so arranged as to enable the use of ferrous electrodes and particularly a ferrous anode, such chambers being shown, described and claimed in my aforesaid co-pending application.

BRIEF DESCRIPTION OF THE DRAWINGS

In the accompanying drawings in which are shown various possible embodiments of the invention.

PREFERRED EMBODIMENTS OF THE INVENTION

Figure 1:
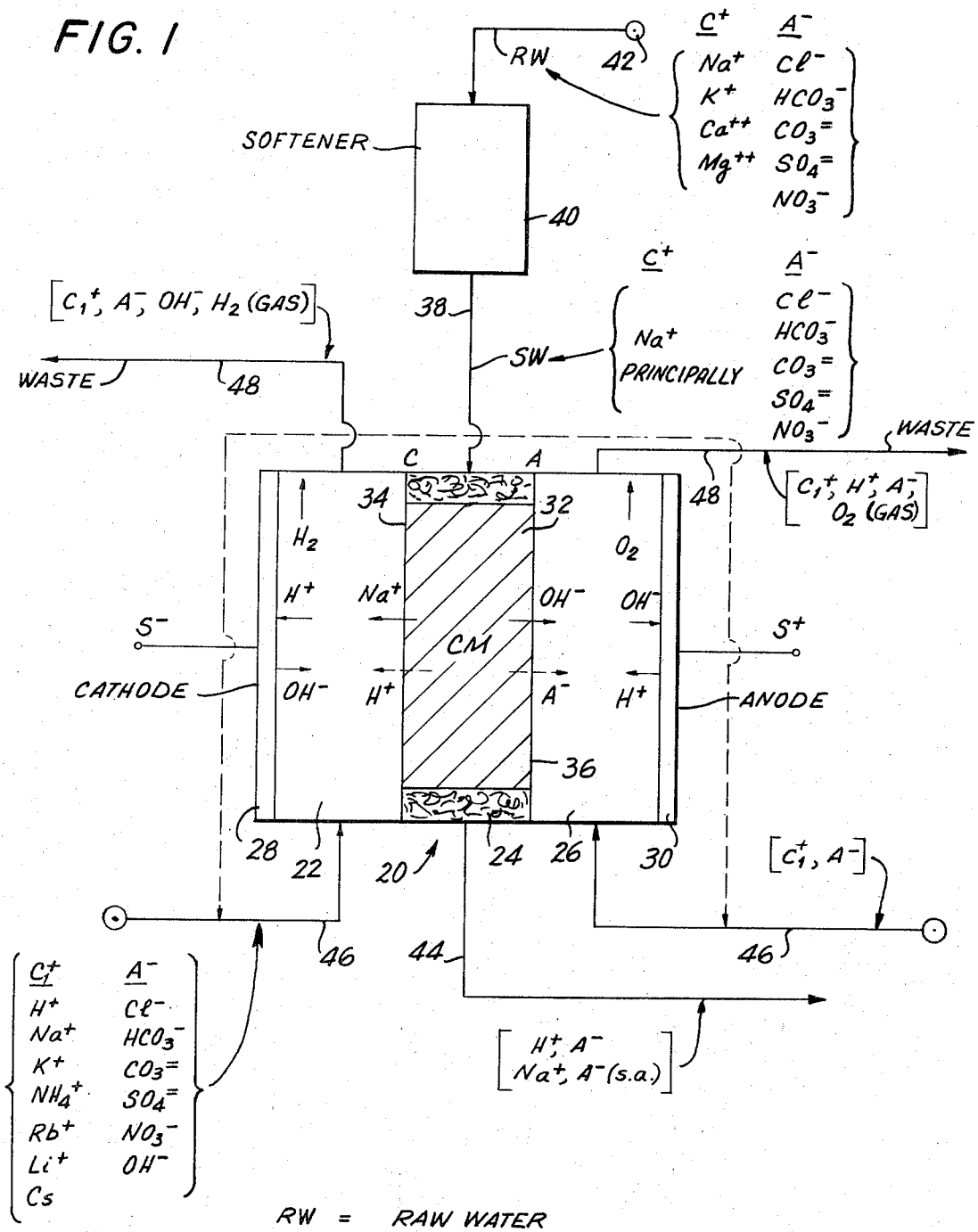
FIGS. 1-7 are schematic views of different electrodialytic cells constructed in accordance with the present invention.

In FIG. 1 there is illustrated the simplest form of electrodialytic cell 20 for carrying out the present invention. This cell is not intended for normal commercial use for a reason which will soon be apparent, but the description thereof does serve to bring out the essential features of the present invention. The cell 20 has been shown with only three chambers 22, 24 and 26. The physical construction of the cell has not been detailed because the general construction of the cell is the same as that of any conventional electrodialytic cell. The novelty of the present invention resides not is physical construction of the cell but in the system in which said cell is used. A conventional electrodialytic cell such as the cell 20 includes a cathode electrode 28 and an anode electrode 30. Both of said electrodes in the simple cell 20 illustrated are of material which is inert to corrosion such, for instance, as a platinized titanium or platinized tantalum. The electrodes are in the form of plates and they form the end members of the cell. The chambers 22, 24 and 26 are located between the electrodes. The chamber 22 is a cathode electrode chamber and also, in the cell under discussion, a waste chamber. The chamber 26 is an anode electrode chamber and also, in the cell under discussion, a waste chamber. The chamber 24 is a treatment chamber. It is filled with an ion exchange material 32, the particular material in FIG. 1 being a cation exchange resin such, for example, as Amberlite 200, 200C, 252, IR-116, IR-120 PLUS, IR-120PD or IR-124 manufactured by Rohm & Haas Co. The expanse between the electrodes is subdivided into the aforesaid chambers by permselective membranes 34 and 36. The membrane 34 of the treating chamber 24 closest the cathode is a cation permselective membrane. The membrane 36 of the treating chamber 24 closest to the anode is an anion permselective membrane. Typical cation permselective membranes are 61AZL183, 61AZL066, 61AZL065, 61CZL183, 61AZG067, 61AZS068 and 61DYG067, manufactured by Ionics, Inc.; MC-3142 and MC-3470 manufactured by Ionac Chemical of Sybron Corp.; and CK-1 and DK-1 manufactured by Asahi Chemical Industry Co. Ltd. Typical anion permselective membranes are 111BZL183, 111BZL066, 111BZL065 and 111EZL219 manufactured by Ionics, Inc.; MA-1348 and MA-3475 manufactured by Ionac Chemical of Sybron Corp.; and CA-1, CA-2, DA-1 and DA-2 manufactured by Asahi Chemical Industry Co. Ltd.

The electrodes and membranes are mutually spaced apart and are parallel. The electrodes and membranes are separated by a gasket of electrically non-conductive liquid impermeable material, e.g. a synthetic plastic which is inert to the chemicals present in the different chambers. A foraminous web (not shown) of an electrically non-conductive inert material, e.g. polyvinylchloride, may be used to fill each of the electrode chambers. The chambers are suitably held together mechanically in end-to-end relationship to form a complete cell 20. The detailed physical structure of the cell and the arrangements for supplying liquids to and withdrawing liquids from the chambers is not illustrated since they form no part of the instant invention and are well known in the art.

Influent is led to the treating chamber 24 through a conduit 38. It is a primary feature of the present invention that this influent is soft water. The term "soft water" as used herein has the meaning generally ascribed to it by the art, to wit, it is water in which the mineral salts in solution therein are highly soluble regardless of the anion associated with the cation employed. Typical such salts are salts of sodium, potassium, lithium, cesium, rubidium and ammonium. However, for practical purposes, soft water, as the term is employed herein, constitutes water in which substantially the only cations are sodium. The term "substantially" is employed in connection with the foregoing definition because it is not possible to entirely exclude every cation. There will be trace cations of other metals caused, for example, by the inability to completely substitute sodium thereof. But the amounts of such trace cations are so small as to be negligible in their total effect on the operation of the cell 20. The soft water present is derived from a softner 40 to which raw water from a source 42 is fed. Such a source typically may constitute tap (drinking) water. The softener 40 can be of any type and can be either external to the cell 20 as illustrated or can form one or more chambers of the cell. The softener 40 illustrated is a softener which is a container that is charged with a bed of cation exchange resin operating on a $NA^-$ cycle. Hence, the water flowing from the softener to the treatment chamber 24 contains sodium cations and a miscellany of anions, the principal anions being bicarbonate, carbonate, sulfate and chloride ions. The effluent leaving the treatment chamber 24 exits through a conduit 44. The effluent is decationized water. During passage through the treatment chamber mainly sodium ions will pass from the treatment chamber through the membrane 34 into the cathode electrode chamber 22 functioning as a waste chamber and mainly hydroxyl ions will pass through the membrane 36 into the anode chamber 26 acting as a waste chamber. Hence, the liquid leaving the treatment chamber contains mainly hydrogen cations and whatever anions might have been present in the soft water. Thus the decationized water has an acidic pH. Such water may be employed wherever the same is commercially acceptable. It has been cationionically demineralized. An aqueous electrolyte also is introduced as an influent into the two waste chambers, a conduit 46 being employed for this purpose. The influent for the waste chambers is water in which there are dissolved water-soluble compounds the cations of which are selected from the group consisting of hydrogen, sodium, potassium, lithium, cesium, rubidium and ammonium. The choice of anions is not critical. An excellent anion due to its high water solubility and the alkalinity consequent upon its use is a hydroxyl anion. The effluent from the waste chambers flows through a conduit 48 to waste and constitutes the influent to which has been added sodium and hydroxyl ions from the waste chamber 22 and hydrogen ions from the waste chamber 26.

When using the cell of FIG. 1, the decationized water effluent can be made to have an extremely low content of cations providing that the power consumption is sufficient for this purpose, it being observed that very large power consumptions are not necessary because of the small voltage drop across the treatment chamber due to the presence of the ion exchange material 32. In the operation of such cell there is no noticeable precipitation of insoluble materials on any elements of the cell. Optionally, the influent into the waste chambers may be soft water derived from the softener 40 as indicated by the dotted lines. Direct current is supplied to the cathode and anode electrodes from a source S.

Figure 2:
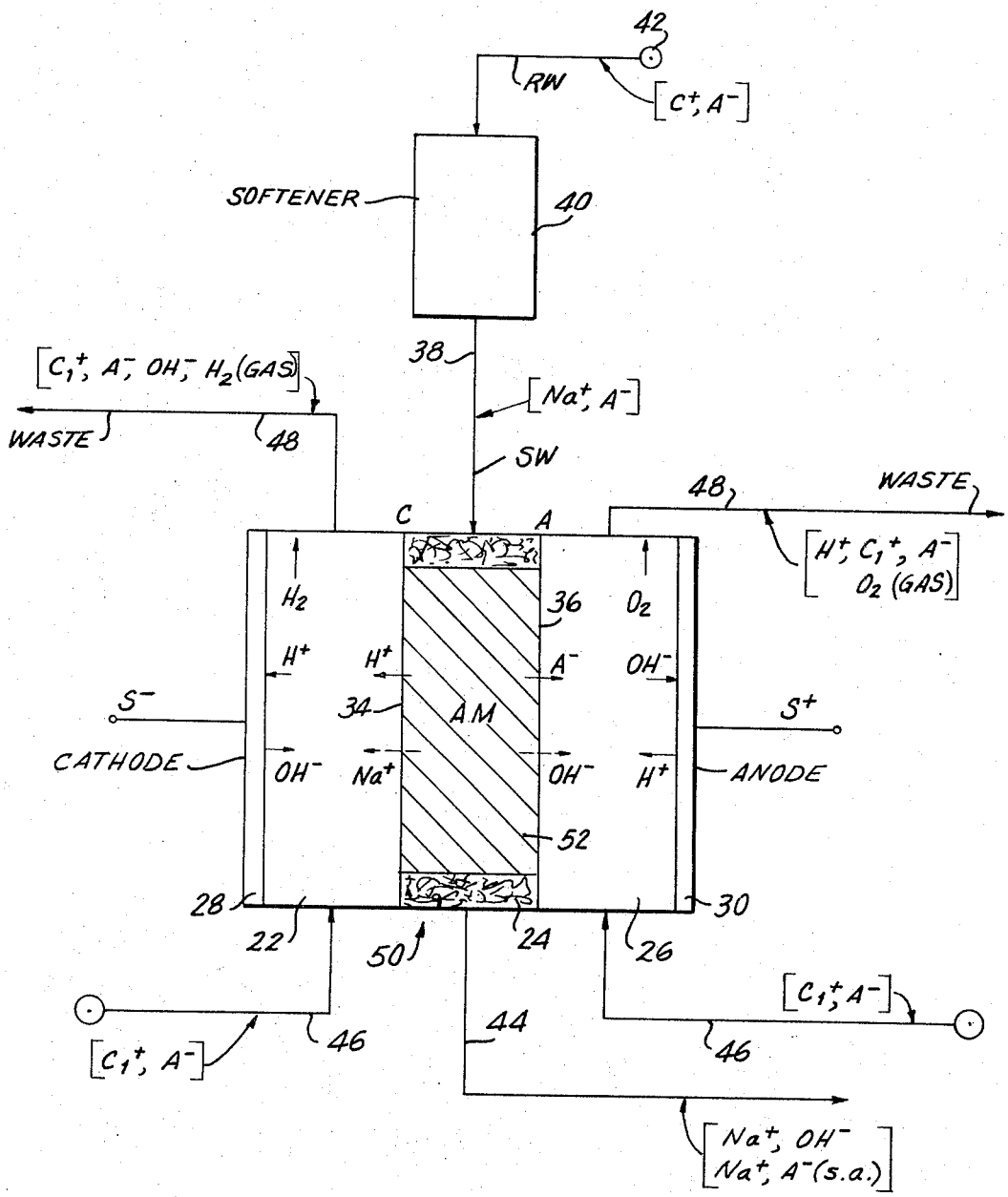

In FIG. 2 an electrodialytic cell 50 has been shown, all the mechanical and electrical components of which are identical to those of FIG. 1 except for the material charged into the treatment chamber. Similarly, the hydraulic system and materials for influent are identical. Accordingly, the same numbers have been used for all of the parts of the cell 50 of FIG. 2 as for the corresponding parts of the cell 20 of FIG. 1 with the exception of the material charged into the chamber 24 which for the cell 50 is denoted by the reference numeral 52. This material in the cell if FIG. 2 is an ion exchange material of the anion exchange type such, for example, as Amberlite IRA-900, IRA-400 and IRA-402 manufactured by Rohm & Haas Co. It may be mentioned that, although in this and other examples herein, resin particles, have been given as examples for ionexchange materials, other physical forms of such materials are with the ambit of the invention, such for instance as membranes, fabrics, filaments and nets.

During passage of the soft water from the conduit 38 through the treatment chamber containing the anion exchange material 52 to the effluent conduit 44 mainly hydrogen ions will flow through the membrane 34 (some sodium ions also will flow through the membrane 34) and mainly the anions present in the soft water will flow through the membrane 36 (some hydroxyl ions also will flow through the membrane 36) so that, accordingly, the effluent will constitute a deanionized water with sodium cations present. Hence, such deanionized water will have an alkaline pH. Aside from the alkalinity of the water, the absence of anions and the presence of sodium cations, the cell 50 has the same advantages over the prior art as the cell 20.

Both of the cells 20 and 50 of FIGS. 1 and 2 are not necessarily restricted to the presence of only one treatment chamber. Either of these cells may include a large number of treatment chambers as, indeed, would normally be the case when it is desired to have a substantial output of deanionized water or of decationized water, and in each instance the treatment chamber will be sandwiched between a pair of waste chambers the influent to which will be water containing almost exclusively water-soluble compounds. Although there is a certain demand for decationized water for industrial use and although the deanionized water made from cells such as the cell 50 can be utilized, the primary purpose of the present invention is to produce deionized water, which is to say, water which is not merely decationized or deanionized, but deionized, for which there is a greater commercial demand. FIGS. 1 and 2 have been shown and described as idealized forms of the basic invention here involved and simplify understanding of the same; the systems of these figures are at the extreme boundaries of the instant invention.

Figure 3:
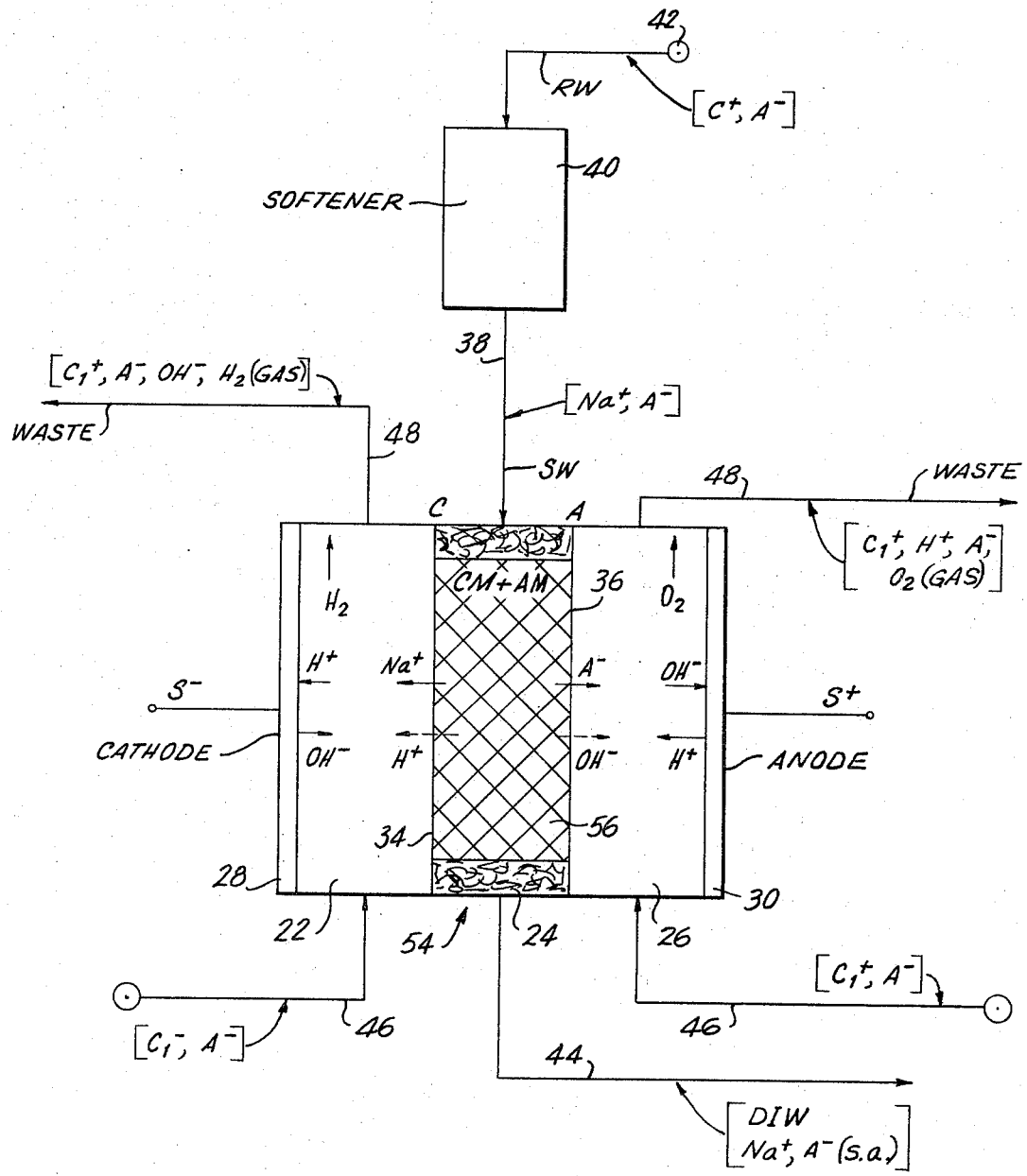

Referring now to FIG. 3, a cell 54 has been illustrated which will produce deionized water with a very low concentration of residual ions. Once again, the cell 54 is the same as the cells 20 and 50 except for the ion exchange material charged into the treatment chamber 24. All other components which are electrical, chemical, structural and hydraulic in nature are the same. The ion exchange material 56 with which the treatment chamber 24 is filled includes both types of material, which is to say, it constitutes a cation exchange material and an anion exchange material, the particular materials being among any of those mentioned hereinabove. Soft water is fed into the chamber containing the material 56. Since the material 56 in the treating chamber includes both cation exchange material and anion exchange material, the effluent therefrom has been deionized both cationically and anionically and, hence, constitutes deionized water.

Figure 4:
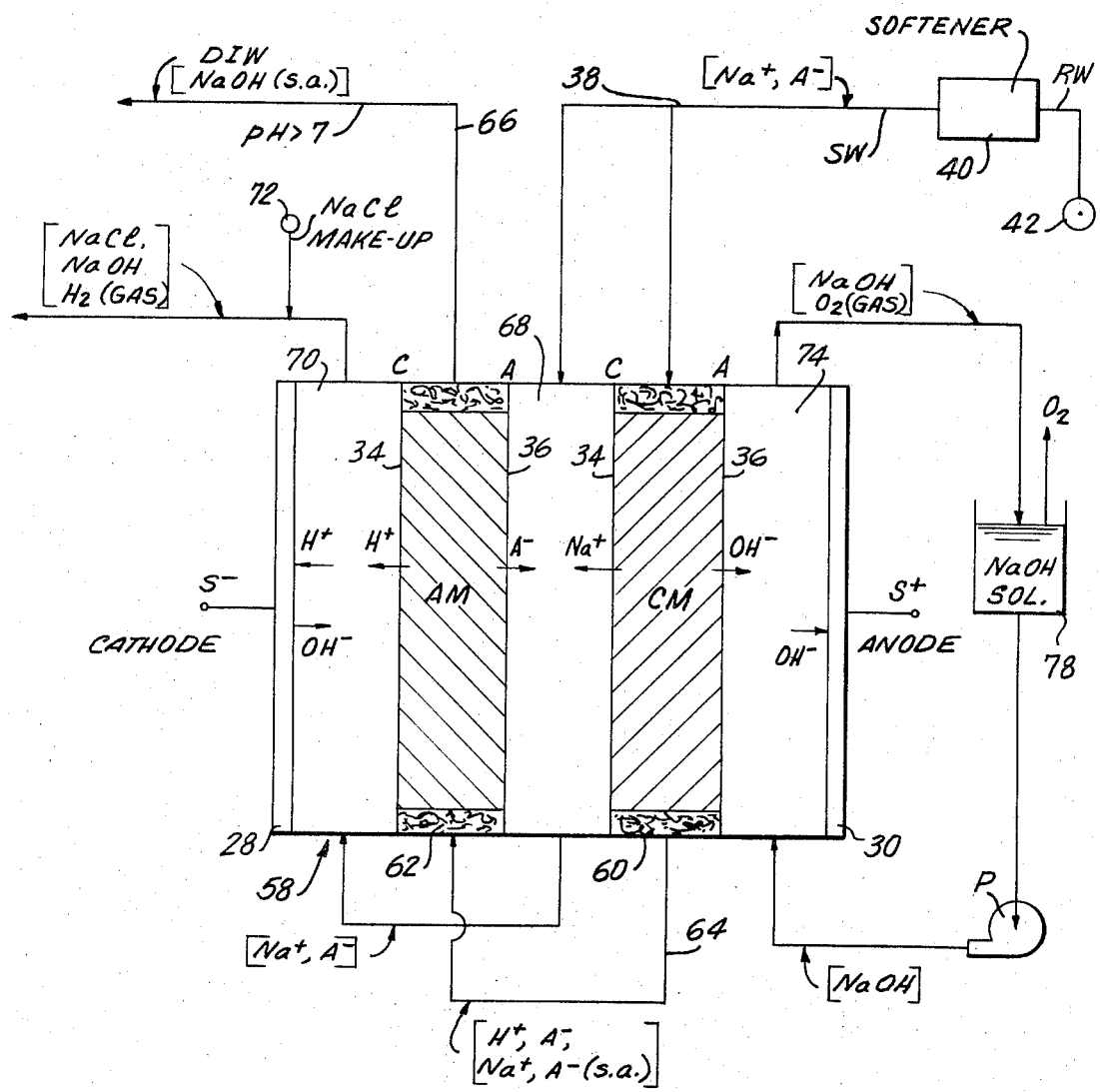

In FIG. 4 a cell 58 is disclosed which is a combination of the cells illustrated in FIGS. 1 and 2. In the cell 58 two treating chambers 60 and 62 have been illustrated for the purpose of producing, jointly, deionized water, one of the treating chambers being of the type which would produce a decationized water such as in FIG. 1, and the other of the type which would produce a deanionized water such as the type of system shown in FIG. 2 (assuming that soft water were fed directly to it). More particularly, in FIG. 4 the treating chamber 60 is filled with a cation exchange material CM and the treating chamber 62 is filled with an anion exchange material AM. Water is led from the softener 40 (all similar parts being denoted by the same numerals as in the earlier figures) to the treating chamber 60 charged with cation exchange material. The effluent from the treating chamber 60 is led through a conduit 64 through the treating chamber 62 filled with anion exchange material, and the effluent from the treating chamber 62 which leaves via a conduit 66 is a deionized water, i.e. a water which has been both decationized and deanionized. The water flowing through the conduit 64 contains hydrogen as a cation and a mixture of anions which were present in the soft water input to the treating chamber 60. In the treating chamber 62 the anions exit through the anion permselective membrane. Due to the sequence of passage through the two treating chambers, the deionized water will have an acceptable pH providing, however, that the amount of anions in the soft water contain a substantial concentration of bicarbonate ions. There is a tendency for the deionized water leaving through the conduit 66 to have a slightly alkaline pH, e.g. about 8 to about 9, due to the presence of a slight amount of sodium hydroxide and the absence of a substantial concentration of bicarbonate ions in the feed water.

It will be noted that in the circulation system illustrated the source of soft water is connected to the inlet of the waste chambers 68 which is between the two treating chambers. The cathode electrode chamber 70 which is between the treating chamber 62 and the cathode electrode 28 is supplied with a sweeping solution from the outlet of the waste chamber 68 which contains additional sodium salts. The effluent from the cathode electrode chamber contains a reasonably high level of sodium salts. This effluent may be used to regenerate the ion exchange material in the softener 40 and make-up sodium chloride may be supplied from a source 72 to the effluent from the cathode electrode chamber 70. Preferably, the anode electrode chamber 74 is swept by a solution of sodium hydroxide through a closed cycle including a pump P and a tank 78 containing a water solution of sodium hydroxide that is concentrated in comparison to the concentration of solutes in the raw water in order to enable the anode electrode to be made of a ferrous material as described in the aforesaid co-pending application Ser. No. 321,333.

Alternately, the anode electrode chamber can be supplied with sodium hydroxide from a source constituting an internal part of the cell.

Purely by way of example, the cathode and anode electrodes may be 1/16 inch thick and made of a stainless steel (304) 21½ long 33 4½ inch wide with an effective area of 0.4 square feet. The cation permselective membranes 34 were AMFion C-100. All the membranes had an effective area of 0.4 square feet. The cation exchange material CM was IR-120 and the anion exchange material AM was IRA-400. The feed soft water contained 100 ppm of sodium chloride. The flow rate at an influent pressure of 6 psi from the water softener 40 was 146 cc. per minute (2 gph). The flow rate through the anode electrode chamber was 115 cc. per minute with a concentration of 2000 ppm of sodium hydroxide. The electricity supplied was 16 volts at 0.4 amps so that there was a current density of 1.0 amps per square foot. The effluent deionized water had a resistivity in the order of 100,000 ohmxcm. The concentration of sodium chloride in the effluent was 4 ppm. The pH was 8.6 due to the presence of some sodium chloride in conduit 64 which was converted to sodium hydroxide in the treating chamber 62.

Where the feed water flow from the softner 40 to the cell contained, instead of 100 ppm of sodium chloride, 50 ppm of sodium chloride and 50 ppm of sodium bicarbonate, all other factors remaining the same, the resistivity of the deionized water was 180,000 ohmxcm. The effluent in conduit 66 contained 2.5 ppm of sodium chloride and the pH was 7.2. The lowering of the alkalinity in such effluent is attributable to the presence of the bicarbonate ion in the soft water fed to the first treating chamber 60 and to the corresponding lowering of the amount of sodium chloride, the bicarbonate anion breaking down in the treating chamber 60 to water and carbon dioxide. The carbon dioxide lowers the pH of the deionized water by reacting with sodium hydroxide to form sodium carbonate.

Figure 5:
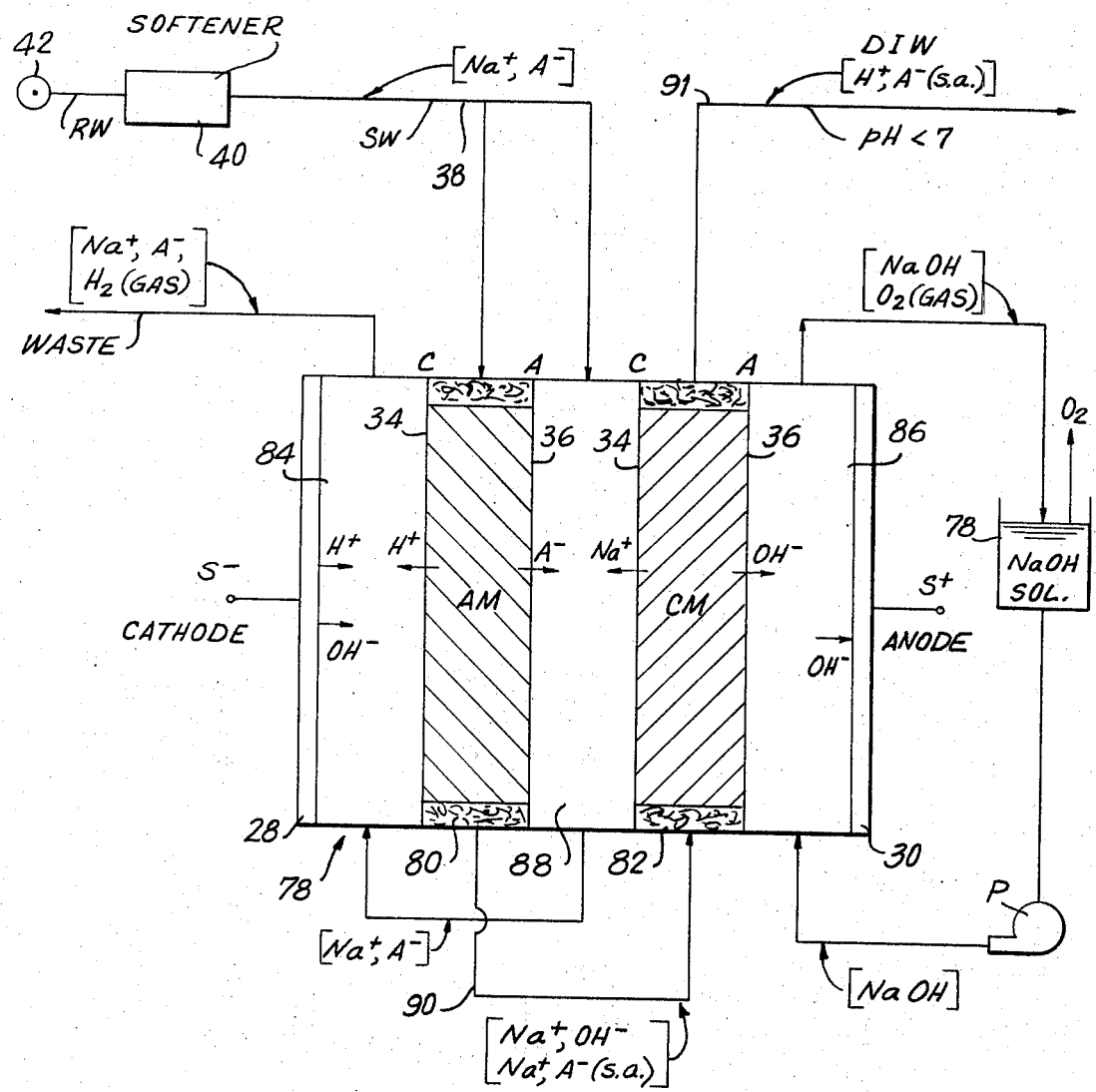

In FIG. 5 another embodiment of the invention is shown constituting an electrodialytic cell 78 with two treating chambers 80 and 82. The treating chamber 80 is filled with an anion exchange material AM and the treating chamber 82 is filled with a cation exchange material CM, these being respectively IRA-400 and IR-120. There is a cathode electrode chamber 84 and an anode electrode chamber 86 as well as a waste chamber 88, the latter being interposed between the two treating chambers.

In the cell 78 a circulation system is employed through the treating chambers which is reverse to that employed in the cell 58 of FIG. 4; that is to say, water flows from the softener 40 first through the anion exchange material AM containing treating chamber 80 and then through a conduit 90 to the treating chamber 82 which contains a cation exchange material CM. From this latter chamber the effluent is deionized water at an acid pH, the reversal in pH's from the cell 58 being due to the reversal in sequence of flow through the two ion exchange treating chambers.

The liquid flowing through the conduit 90 contains sodium hydroxide as distinguished from the mixture of acids contained in the conduit 64 leading from the first treating chamber to the second treating chamber. The influent to the waste chamber 88 is soft water, e.g. from the water softener 40, and the effluent from the waste chamber runs to the cathode chamber 84. The effluent from the cathode chamber is led to waste or used for regeneration of the ion exchange material in the softener 40. The anode chamber has a circulation system which sweeps this chamber with sodium hydroxide in accordance with the invention described in the aforesaid co-pending application.

With the soft water feed influent containing 100 ppm of sodium chloride at a pressure of 6 psi and a flow rate of 126 cc. per minute, with the flow rate to waste of 40 cc. per minute, with an anode electrode chamber flow rate of 115 cc. per minute at a caustic concentration of 4000 ppm of sodium hydroxide, and with power supplied to the cell 78 of 16 volts at 0.4 amps and a corresponding current density of 1.0 amps per square feet, the effluent water in conduit 91 will have a resistivity of 80,000 ohmxcm., 5 ppm of sodium chloride and a pH of 4.6. The power consumption is 3.2 kilowatts per thousand gallons.

It will be observed that by passing the substantially neutral feed in succession through the anion and then the cation exchange treating chambers, the effluent of deionized water has an acid pH (4.6), this being due to the presence of a small amount of sodium chloride in the conduit 90 which is converted to an acid in the treating chamber 82.

Figure 6:
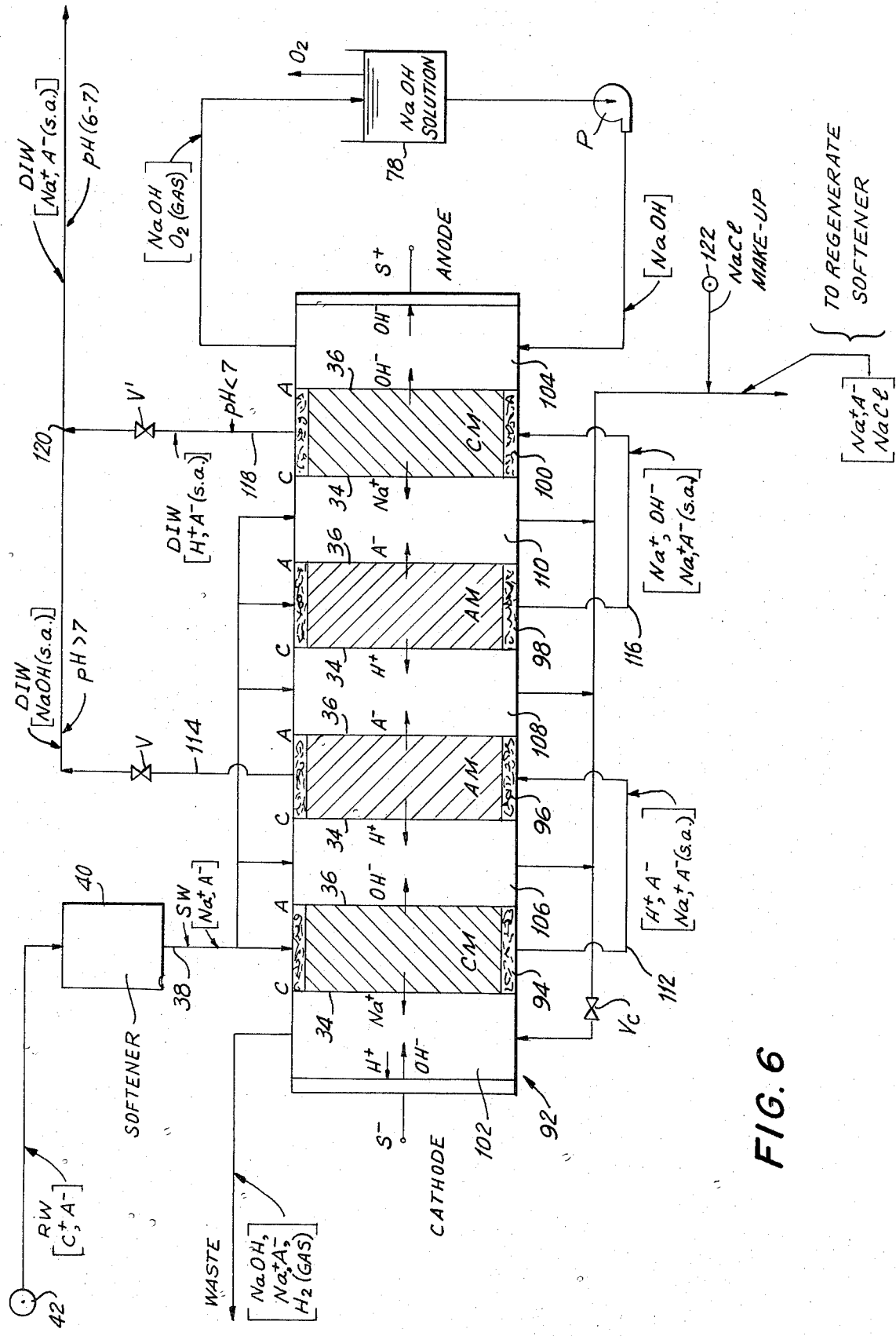
Figure 7:
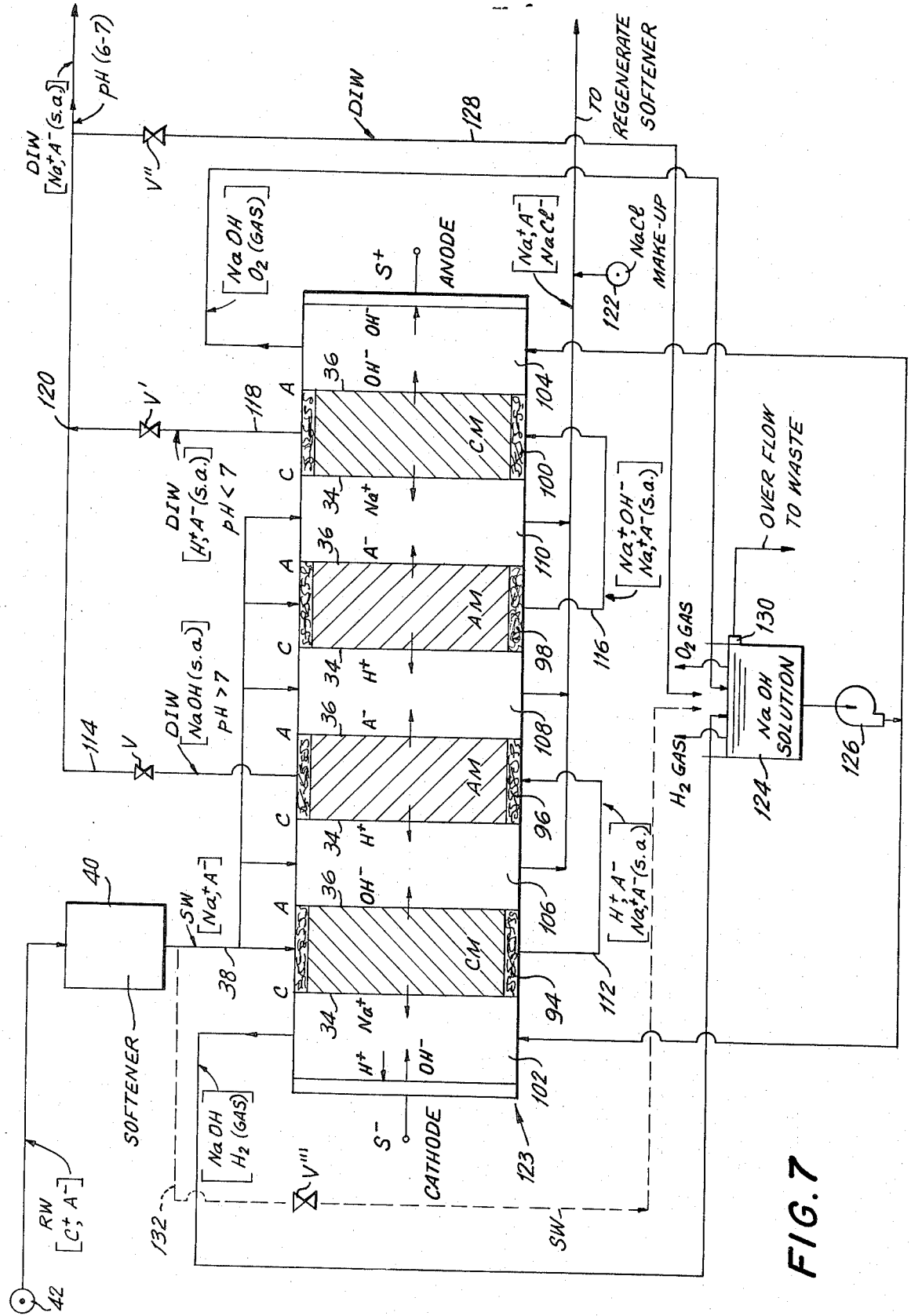

In FIGs. 6 and 7 two similar electrodialytic cells are shown, differing from each other solely in the electrode chamber circulation system. The arrangements of the treating and intermediate waste chambers are identical. Referring first to FIG. 6, the electrodialytic cell 92 has four treating chambers 94, 96, 98 and 100 of which the chambers 94 and 100 are charged with a cation exchange material CM and the remaining chambers 96 and 98 are charged with an anion exchange material AM. The reference numeral 102 denotes the cathode electrode chamber and the reference numeral 104 the anode electrode chamber. There is a waste chamber 106 between the treating chambers 94 and 96, a waste chamber 108 between the treating chambers 96 and 98 and a waste chamber 110 between the treating chambers 98 and 100. Soft water from the softener 40 flows into the treating chamber 94, the effluent from which is led through a conduit 112 to the treating chamber 96 from which alkaline deionized water exits through a conduit 114 at a pH of about 8.6. This constitutes the CM/AM deionizing circuit such as described with reference to FIG. 4.

At the same time, soft water flows from the softener 40 through an AM/CM circuit to the treating chamber 98, the effluent from which is led through a conduit 116 to the treating chamber 100 from which deionized water exits through a conduit 118. This deionized water is acidic at a pH of about 4.6. The effluent streams from the conduits 114, 118 are blended at a junction 120. The pH of the combined streams is between 6 and 7 (assuming a low concentration of bicarbonate ions in the feed water) which is satisfactory for use as deionized water for most commercial purposes.

The pH of the blended stream can be adjusted by regulating either or both valves V, V' in the effluent or influent legs of the two circuits. Soft water is led from the softener 40 to the three waste chambers 106, 108 and 110, the effluent from which is rich in sodium salts so that it can be employed to regenerate the ion exchange material in the softener 40 when necessary. A part of the effluent from the waste chambers is led through a regulating valve $V_c$ to the cathode electrode chamber 102 from which the effluent flows to waste.

For reasons outlined in the aforesaid co-pending application, a water solution high in sodium hydroxide is circulated through the anode electrode chamber 104 in order to prevent attack on the anode plate if the same is not inert, for example, if a ferrous metal is employed for plate. The circulating system for the anode electrode chamber sodium hydroxide solution includes a pump P and a sodium hydroxide tank 78 to maintain a suitable sodium hydroxide concentration, e.g. in the neighborhood of 2000–4000 ppm.

The effluent from the treating chamber 94 contains the anions present in the feed soft water, while the effluent from the treating chamber 98 contains the cations present in the feed soft water, being principally sodium.

A source 122 of sodium chloride may introduce make-up sodium chloride into the effluent from the waste chambers if the same is to be employed for regenerating the ion exchange material in the water softener 40.

In FIG. 7 the same reference numerals have been used as in FIG. 6 for corresponding parts. The difference between these two figures, as noted previously, resides in the circulation of electrolyte through the two electrode chambers. Instead of having a sodium hydroxide circulating system solely for the anode electrode and utilizing the effluent from the waste chamber for sweeping the cathode electrode chamber, in the cell 123 a sodium hydroxide make-up tank 124 and pump 126 are employed common to both electrode chambers. The sodium hydroxide solution exiting from the tank 124 via the pump 126 is split to be introduced into both of the electrode chambers from which the effluent flows back to the sodium hydroxide tank. It will be observed that sodium hydroxide is generated in the cathode electrode chamber 102 but is not consumed in the anode electrode chamber 104. Accordingly, there would be a build-up of caustic soda. The concentration of sodium hydroxide is maintained at a proper dilution level by diverting some of the output deionized water through a conduit 128 at an approximate neutral pH beyond the junction 120 back to the sodium hydroxide make-up tank 124, the ensuing increase in volume of the liquid in the make-up tank 124 being led to waste at an overflow 130. The amount is controlled by a valve V". Alternatively diluting water can be taken from the soft water line via a valved conduit 132 (shown in dotted lines).

A typical set of operating conditions for the cell of FIG. 7 is the following:

Electrodes of stainless steel (304) 1/16 inches thick, 21½ inches × 4½ inches, membranes C-100 and A-100, ion exchange materials IR-120 and IRA-400. The effluent from the softener 40 contains 250 ppm of sodium chloride at a pH of 6.7. The current is 1.0 amp. The voltage is 35 volts. The current density is 2.5 amps per square feet. The pressure at the outlet of the softener 40 is 4.5 psi. The flow rate in the CM/AM circuit averages 2 gallons per hour and in the AM/CM circuit likewise averages 2 gallons per hour, so that the total flow rate averages 4 gallons per hour. The total flow rate of the stream leaving the waste chambers is 20 cc. per minute. The flow rate of the deionized water diverted to the caustic tank through the conduit 128, and therefore the flow rate leaving through the overflow 130, is 3 cc. per minute. The effluent from the CM/AM circuit has an average resistivity of 50,000 ohmxcm., corresponding to a concentration of 8 ppm sodium chloride and a pH of 8.8. The effluent from the AM/CM circuit has an average resistivity of 70,000 ohmxcm. corresponding to a concentration of 5.5 ppm sodium chloride and a pH of 4.6. The combined effluent has an average resistivity of 65,000 ohmxcm. corresponding to a concentration of 6 ppm sodium chloride and a pH of 6.2. The direct current power consumption is 8.8 kilowatt hours per thousand gallons.

It will be observed that the change in pH from the 6.7 value for the effluent from the softener 40 to the 6.2 value for the combined effluent from both treating chamber circuits represents a relatively small shift of 0.5 at near neutrality, this being satisfactory for most commercial purposes.

Using the same cell 123, but doubling the concentration of sodium chloride in the soft water from 250 to 500 ppm (pH 5.7), with an output pressure from the softener 40 at 5.5 psi, and increasing the current from 1.0 to 2.0 amps, the voltage to 50 and the current density to 5.0 amps per square foot, yields the following results:

Flow rate in each ion exchange paired circuit is an average of 2 gallons per hour with an average combined flow rate for both of 4 gallons per hour. Flow rate from the combined waste chambers is 23 cc. per minute. From the CM/AM circuit the effluent has an average resistivity of 45,000 ohmxcm., corresponding to a concentration of 9 ppm sodium chloride and a pH of 9.1. The effluent from the AM/CM circuit has an average resistivity of 30,000 ohmxcm., corresponding to a concentration of about 12 ppm sodium chloride and a pH of 4.0. The combined effluents from the two circuits has an average resistivity of 70,000 ohmxcm., corresponding to a concentration of about 6 ppm sodium chloride and a pH of 5.7 which is acceptable for commercial purposes.

It will be observed that there is no noticeable change in pH.

It thus will be seen that there are provided systems which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. An electrodialytic apparatus for the treatment of soft water, said apparatus comprising at least nine serially disposed compartments including a first compartment having a ferrous cathode electrode disposed therein, a second compartment immediately adjacent said first compartment and separated therefrom by a cation permselective membrane, a bed of cation exchange material disposed within said second compartment, a third compartment immediately adjacent said second compartment and separated therefrom by an anion permselective membrane, a fourth compartment immediately adjacent said third compartment and separated therefrom by a cation permselective membrane, a bed of anion exchange material disposed within said fourth compartment, a fifth compartment immediately adjacent said fourth compartment and separated therefrom by an anion permselective membrane, a sixth compartment immediately adjacent said fifth compartment and separated therefrom by a cation permselective membrane, a bed of anion exchange material disposed within said sixth compartment, a seventh compartment immediately adjacent said sixth compartment and separated therefrom by an anion permselective membrane, an eighth compartment immediately adjacent said seventh compartment and separated therefrom by a cation permselective membrane, a bed of cation exchange material disposed within said eighth compartment, a ninth compartment immediately adjacent said eighth compartment and separated therefrom by an anion permselective membrane, said ninth compartment having a ferrous anode electrode disposed therein, means for introducing soft water into the second, third, fifth, sixth and seventh compartments, means for removing fluid from the second, third, fifth, sixth and seventh compartments, means for introducing fluid removed from the second compartment into the fourth compartment, means for introducing fluid removed from the sixth compartment into the eighth compartment, means for removing fluid from the third, fifth and seventh compartments and leading the same to a treatment means, means for removing fluid from the fourth and eighth compartments, combining the same and leading the combined fluids to an outlet for use, and means for impressing a direct electric current across said cathode and anode electrodes whereby the fluid leaving the fourth compartment is deionized water at an alkaline pH, the fluid leaving the eighth compartment is deionized water at an acidic pH, and the combined fluids comprise deionized water at a substantially neutral pH.

2. An apparatus as set forth in claim 1 wherein the first and ninth compartments contain means for continuously passing an electrolytically conductive aqueous solution therethrough.

3. An apparatus as set forth in claim 2 wherein the continuous passing means in the ninth compartment continuously passes an aqueous caustic solution therethrough.

4. An apparatus as set forth in claim 1 wherein the first and ninth compartments contain means for continuously passing an aqueous caustic solution therethrough.

* * * * *